No. 685,637. Patented Oct. 29, 1901.
S. A. PECKHAM.
HOOK AND EYE.
(Application filed Feb. 14, 1901.)
(No Model.)
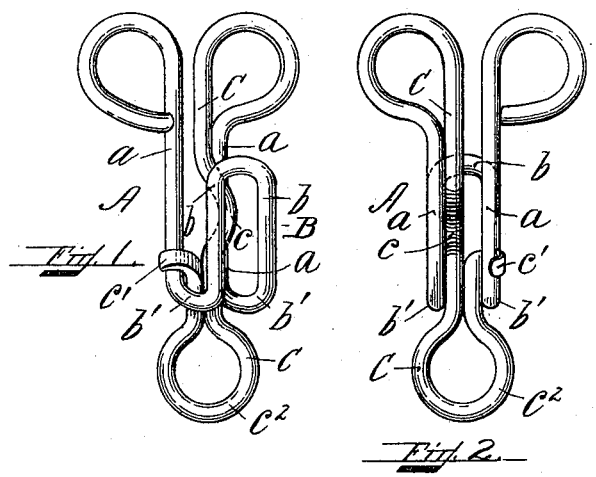

UNITED STATES PATENT OFFICE.

SARAH ANN PECKHAM, OF FALL RIVER, MASSACHUSETTS.

HOOK AND EYE.

SPECIFICATION forming part of Letters Patent No. 685,637, dated October 29, 1901.

Application filed February 14, 1901. Serial No. 47,286. (No model.)

*To all whom it may concern:*

Be it known that I, SARAH ANN PECKHAM, a citizen of the United States, residing at Fall River, in the county of Bristol and State of Massachusetts, have invented certain new and useful Improvements in Hooks and Eyes, of which the following is a specification, reference being had therein to the accompanying drawings.
Figure 1 is a perspective view of my improved hook, and Fig. 2 is a bottom plan view of said hook.

My invention relates to hooks and eyes for fastening garments together, and has special reference to means to prevent the bill of the hook from being lifted away from the plane of the fabric to which the hook is secured.

In the drawings illustrating this principle of my invention and the best mode now known to me of applying that principle, A is the shank of the hook, B the bill, and C the spring-tongue. The hook is made of wire, the parallel wires $a\ a$ and $b\ b$, respectively, forming the shank A and the bill B, the tongue C being made integral with the bill and shank and extending between the two shank-wires $a\ a$ and beyond the bend $b'$ of the bill B. Here it is formed into an eye $c^2$ and returns upon itself in the plane of, parallel with, and between the two shank-wires $a\ a$, the end portion $c'$ of the tongue projecting across and above one of the shank portions $a\ a$ near the bend $b'$ of the bill B.

To use my invention, the hook is secured to the fabric at its thread-eyes in its front and rear portions. If for any reason a pressure in a direction away from the hook and fabric is exerted on the bill end $b$ of the bill B, the bill tends to be lifted away from the fabric; but its movement is immediately arrested by one of its shanks becoming engaged with the end portion $c'$ of the tongue. Clearly this construction prevents both temporary and permanent distortions of the bill, that are likely to result from the use of wire hooks heretofore used.

It being understood that I desire to claim my invention in the broadest manner legally possible, what I claim is—

A hook made up of a continuous rod, so bent, that parallel portions thereof form a shank and bill of the hook, and that the tongue-forming portion thereof lies between said shank portions, extends outwardly beyond the bend of the bill, is formed into an eye, returns upon itself in the plane of, parallel with, and between the shank portions of said rod, and then projects toward and above one of said parallel portions of said shank, and engages the same to prevent the bill and adjacent portions of the shank from being lifted away from the fabric to which the hook is secured.

In testimony whereof I affix my signature in presence of two witnesses.

SARAH ANN PECKHAM.

Witnesses:
BERTHA L. HATHAWAY,
ROBERT C. DAVIS.